US009578097B2

(12) United States Patent
Gladwin et al.

(10) Patent No.: US 9,578,097 B2
(45) Date of Patent: *Feb. 21, 2017

(54) BLOCK BASED ACCESS TO A DISPERSED DATA STORAGE NETWORK

(75) Inventors: S. Christopher Gladwin, Chicago, IL (US); Greg Dhuse, Chicago, IL (US); Vance Thornton, Columbus, OH (US); Mainsh Motwani, Chicago, IL (US); Jason Resch, Chicago, IL (US); Ilya Volvovski, Chicago, IL (US); Jamie Bellanca, Chicago, IL (US); John Quigley, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 12/950,755

(22) Filed: Nov. 19, 2010

(65) Prior Publication Data

US 2011/0072115 A1    Mar. 24, 2011

Related U.S. Application Data

(62) Division of application No. 11/973,613, filed on Oct. 9, 2007.

(51) Int. Cl.
*G06F 15/167* (2006.01)
*H04L 29/08* (2006.01)
(Continued)

(52) U.S. Cl.
CPC ........... *H04L 67/1097* (2013.01); *G06F 3/067* (2013.01); *G06F 3/0617* (2013.01); *G06F 3/0619* (2013.01);
(Continued)

(58) Field of Classification Search
CPC .... G06F 11/1076; G06F 3/0619; G06F 3/067; G06F 3/064; G06F 3/0617; G06F 3/0635; G06F 3/0659; H04L 67/1097; H04L 67/06
(Continued)

(56) References Cited

U.S. PATENT DOCUMENTS 5,485,474 A * 1/1996 Rabin .................... G06F 11/004
714/762
7,146,461 B1    12/2006 Kiselev et al.
(Continued)

FOREIGN PATENT DOCUMENTS

WO    2007103533 A1    9/2007

OTHER PUBLICATIONS

Extended European Search Report for Application No. 08837609.0 dated Jul. 12, 2012; 8 pgs.
(Continued)

*Primary Examiner* — David Lazaro
*Assistant Examiner* — Vitali Korobov
(74) *Attorney, Agent, or Firm* — Garlick & Markison; Timothy W. Markison

(57) ABSTRACT

A computer includes a data transform algorithm, a data dispersal algorithm, and a network port. The data transform algorithm performs a data transformation on a data block to produce a transformed data block. The data dispersal algorithm performs a data dispersal function on the transformed data block to produce a plurality of data slices, wherein each of the plurality of data slices includes less than all data contained in the transformed data block. The network port is operable to transmit a plurality of write commands to a plurality of slice servers, wherein each of the plurality of write commands includes a corresponding one of the plurality of data slices. The network port is further operable to receive verification of storage of at least some of the
(Continued)

plurality of data slices from at least some of the plurality of slice servers.

6 Claims, 8 Drawing Sheets

(51) Int. Cl.
   *G06F 3/06* (2006.01)
   *G06F 11/10* (2006.01)
   *G06F 15/16* (2006.01)
(52) U.S. Cl.
   CPC .......... *G06F 3/0635* (2013.01); *G06F 3/0659* (2013.01); *G06F 11/1004* (2013.01); *G06F 11/1076* (2013.01); *H04L 67/06* (2013.01)
(58) Field of Classification Search
   USPC   709/203, 211, 217, 236, 245, 246; 380/278, 44
   See application file for complete search history.

(56) References Cited

U.S. PATENT DOCUMENTS

| | | | | |
|---|---|---|---|---|
| 7,636,724 | B2 | 12/2009 | de la Torre et al. | |
| 7,711,539 | B1* | 5/2010 | Kimmel | G06F 3/0622 703/23 |
| 8,209,363 | B2* | 6/2012 | Palthepu | G06F 17/30106 707/652 |
| 8,285,878 | B2* | 10/2012 | Gladwin | G06F 3/0617 709/203 |
| 8,478,865 | B2* | 7/2013 | Quigley | G06F 17/30194 709/203 |
| 8,965,956 | B2* | 2/2015 | Palthepu | H04L 67/1097 709/203 |
| 2004/0064462 | A1* | 4/2004 | Smith | G06F 17/30067 |
| 2004/0228493 | A1* | 11/2004 | Ma | G06F 21/64 380/286 |
| 2004/0243828 | A1* | 12/2004 | Aguilera | G06F 21/64 726/27 |
| 2005/0144514 | A1 | 6/2005 | Ulrich et al. | |
| 2006/0253497 | A1* | 11/2006 | Abali | G06F 17/30224 |
| 2006/0269148 | A1* | 11/2006 | Farber | G06Q 40/00 382/232 |
| 2007/0079082 | A1* | 4/2007 | Gladwin | G06F 11/1076 711/154 |
| 2007/0143359 | A1 | 6/2007 | Uppala | |
| 2007/0214285 | A1* | 9/2007 | Au | H04L 67/1097 709/246 |
| 2008/0043750 | A1* | 2/2008 | Keels | H04L 49/9094 370/395.52 |
| 2008/0273693 | A1* | 11/2008 | Au | H03M 7/40 380/28 |
| 2009/0254572 | A1* | 10/2009 | Redlich | G06Q 10/06 |
| 2011/0167212 | A1* | 7/2011 | Lowe | G06F 21/552 711/112 |

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

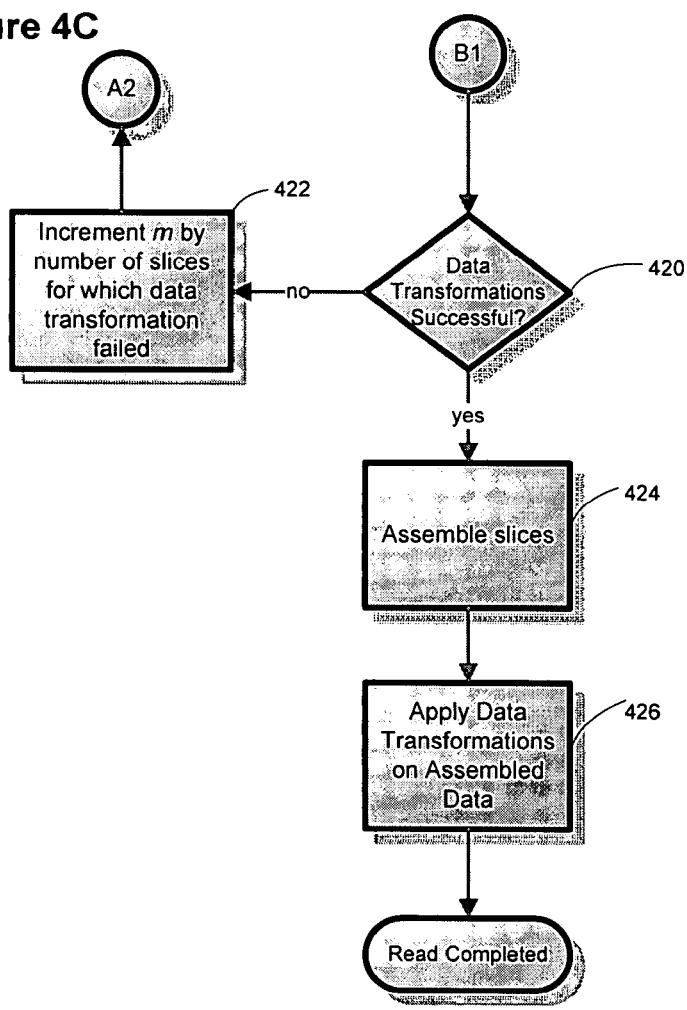

BLOCK BASED ACCESS TO A DISPERSED DATA STORAGE NETWORK

CROSS-REFERENCE TO RELATED APPLICATIONS

The present U.S. Utility patent application is claiming priority under 35 USC §121 as a divisional patent application of co-pending patent application entitled, "Block Based Access to a Dispersed Data Storage Network," having a filing date of Oct. 9, 2007, and a Ser. No. 11/973,613, which is incorporated herein by reference in its entirety.

BACKGROUND OF THE INVENTION

Technical Field of the Invention

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for block based access to a dispersed data storage network.

Description of the Related Art

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple stripes, each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Files are usually organized in file systems, which are software components usually associated with an operating system. Typically, a file system provides means for creating, updating, maintaining, and hierarchically organizing digital data. A file system accepts digital data of arbitrary size, segments the digital data into fixed-size blocks, and maintains a record of precisely where on the physical media data is stored and what file the data is associated with. In addition, file systems provide hierarchical directory structures to better organize numerous files.

Various interfaces to storage devices are also well known in the art. For example, Small Computer System Interface ("SCSI") is a well known family of interfaces for connecting and transferring data between computers and peripherals, including storage. There are also a number of standards for transferring data between computers and storage area networks ("SAN"). For example, Fibre Channel is a networking technology that is primarily used to implement SANs. Fibre Channel SANS can be accessed through SCSI interfaces via Fibre Channel Protocol ("FCP"), which effectively bridges Fibre Channel to higher level protocols within SCSI. Internet Small Computer System Interface ("iSCSI"), which allows the use of the SCSI protocol over IP networks, is an alternative to FCP, and has been used to implement lower cost SANs using Ethernet instead of Fibre Channel as the physical connection. Interfaces for both FCP and iSCSI are available for many different operating systems, and both protocols are widely used. The iSCSI standard is described in "Java iSCSI Initiator," by Volker Wildi, and Internet Engineering Task Force RFC 3720, both of which are hereby incorporated by reference.

In 1979, two researchers independently developed a method for splitting data among multiple recipients called "secret sharing." One of the characteristics of secret sharing is that a piece of data may be split among n recipients, but cannot be known unless at least t recipients share their data, where n≥t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s = sOr_a Or_b Or_c$$

where s is the original source data, $r_a$, $r_b$, and $r_c$ are random bytes given to three of the four recipients, and s is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks ("DDSNs"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

However, prior art dispersed data storage networks have had limited application. In particular, the prior art dispersed data storage networks have not been generally accessible by commonly used operating systems. Rather, dispersed data storage networks have been used to accomplish specific tasks, such as securing extremely sensitive information, or for experimental purposes. Nonetheless, a generally accessible dispersed data storage network would offer significant utility to a wide variety of users. For example, a dispersed data storage network could be interfaced to servers implementing an online store and used to warehouse customer information, like credit card numbers. This would allow the online store the advantages of a dispersed data network without having to implement a special interface to the dispersed data network. Other uses of a block-based interface to a dispersed data storage network are apparent to a person of ordinary skill in the art.

SUMMARY OF THE INVENTION

The disclosed invention achieves its objectives by providing a block-based interface to a dispersed data storage network. A block-based interface can be provided through means such as a customized iSCSI Target, or through a device driver written for a specific operating system. By providing a block-based interface, a dispersed data storage network can be mounted onto a computer system as an ordinary drive. The user of the computer can then interact with the dispersed data storage network as if it were an ordinary drive, i.e., files can be copied to the dispersed data storage network by dragging them to the appropriate drive icon. In addition, a user of the dispersed data storage network can use file systems provided by the operating system of the user's computer, such as NTFS, HFS+ and ext3.

In one aspect of the disclosed invention, a method of reading data from a dispersed data storage network is disclosed. A fixed-size block of data is requested from an interface operating on a user's computer. In response to the requested block of data, a list of slice servers holding data slices associated with the requested block is assembled. The data slices associated with the requested block are then read from the slice servers on the assembled list until enough data slices have been read to reconstruct the requested data block. The requested data block is then assembled and provided to a requesting application through an interface on the user's computer.

As part of the process of reading a block of data from the dispersed data storage network, data slices may be decrypted or decompressed. In addition, a checksum may be computed for each received data slice and compared to a CRC or other form of checksum appended to the data slice to ensure the integrity of the received data slice. Similar procedures may be performed on each assembled block.

In another aspect of the disclosed invention, a method of writing data to a dispersed data storage network is disclosed. A fixed-size block of data is accepted by an interface on a user's computer. The block is then segmented into a predetermined number of data slices, each of which is then transmitted to a separate slice server for storage.

As part of the process of writing a block of data to the dispersed data storage network, the data block may be encrypted or compressed. In addition, a checksum may be computed and appended to each block, so that the integrity of each block may be verified when read from the dispersed data storage network. Similar procedures may be formed for each written data slice.

In yet another aspect of the disclosed invention, a distributed computer system implementing a dispersed data storage network is disclosed. The system includes an operating system with one or more file system components, such as NTFS, FAT32, HFS+, or ext3. The file system will expose interfaces to application programs allowing digital files to be read and written. The system also includes a data dispersal/assembly software component, which interacts with the file system and slice servers resident on dispersed data storage network via a network layer.

The disclosed distributed computer system could implement a block-based interface to the dispersed data storage network via an iSCSI Target. Alternatively, the block-based interface could be implemented as a device driver.

BRIEF DESCRIPTION OF THE DRAWINGS

FIGS. 4A-4C collectively illustrates a read operation from a dispersed data storage network constructed in accordance with an embodiment of the disclosed invention;

DETAILED DESCRIPTION OF THE ILLUSTRATED EMBODIMENT

Figure 1:
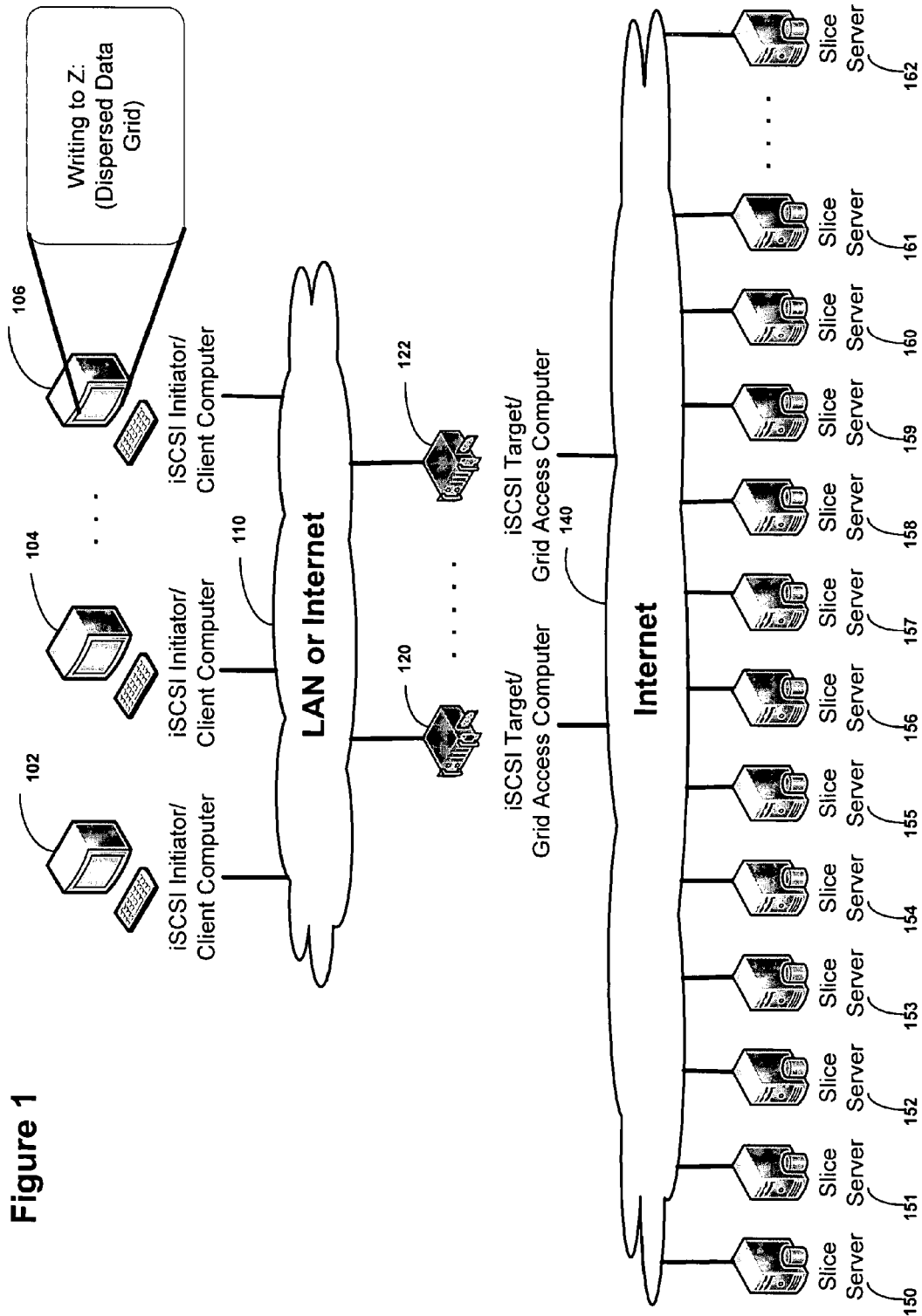
FIG. 1 is a network diagram of a dispersed data storage network constructed in accordance with an embodiment of the disclosed invention.

Turning to the Figures, and to FIG. 1 in particular, a distributed computer system implementing a dispersed data storage network 100 is shown. An arbitrary number of slice servers 150-162 store data slices sent to them by networked source computers 102,104,106. As illustrated, some number of grid access computers 120,122 serve as networked iSCSI Targets for an arbitrary number of source computers 102, 104,106, which are configured as iSCSI Initiators.

As explained herein, the disclosed invention allows a dispersed data storage network to be presented as a block device, which can be mounted as a network drive by compatible operating systems. As illustrated, the dispersed data storage network is accessed by the source computers 102,104,106, as an iSCSI Target. In particular, each source computer 102,104,106 writes data blocks to an iSCSI Initiator, which forms network commands that are directed to an associated iSCSI Target, which is in this case implemented on grid access computers 120,122. Note that an iSCSI Target could be implemented on the source computers 102,104,106, which would make the grid access computers 120,122 unnecessary. In addition, a different storage protocol, such as FCP or ATA over Ethernet could be used, or a device driver could be implemented directly on the source computers 102,104,106 to present the dispersed data storage network as a mounted drive. The iSCSI implementation discussed herein is only used as a device to aid the understanding of the disclosed invention by a person of ordinary skill in the art.

Figure 2:
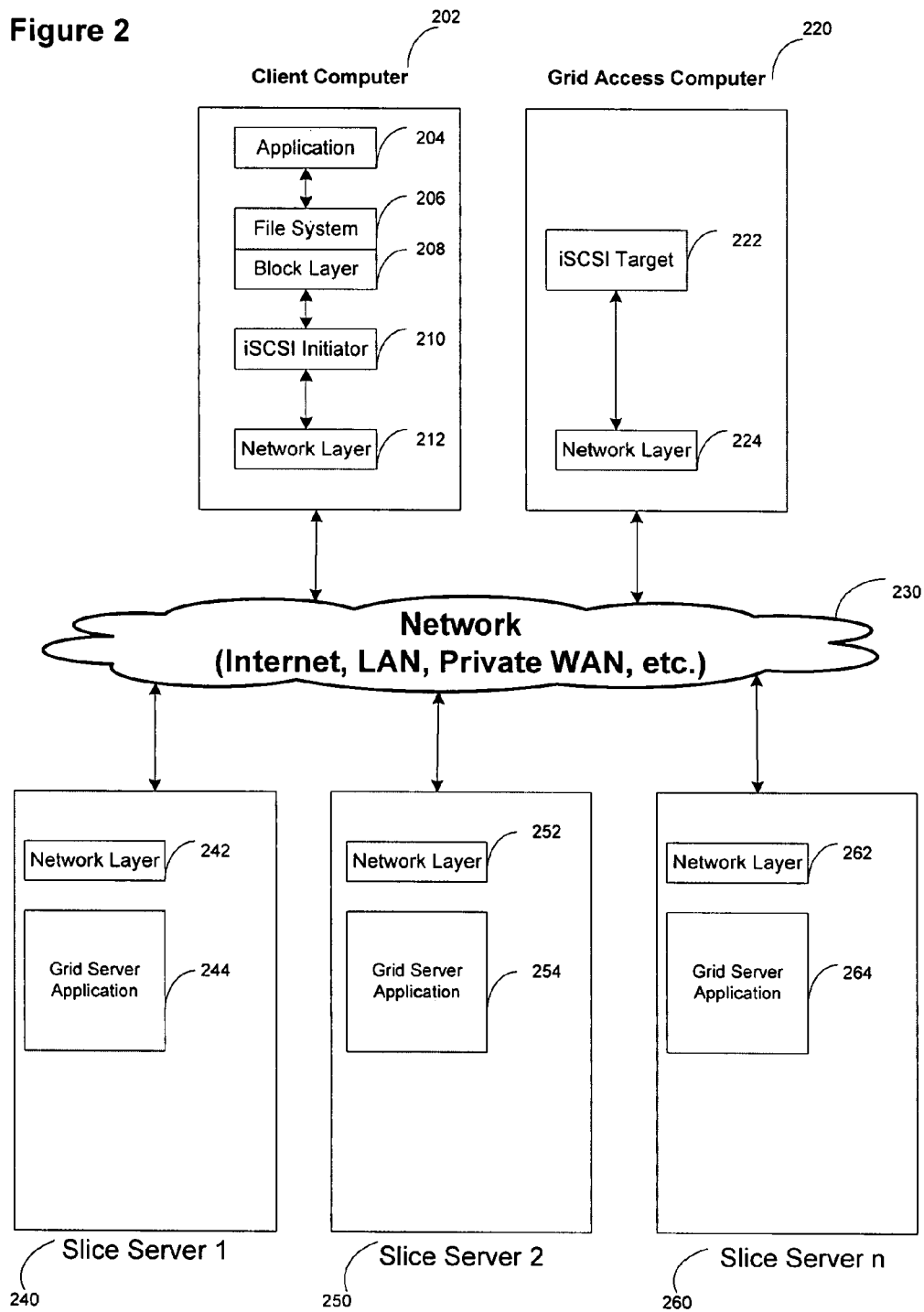
FIG. 2 is a block diagram illustrating the interoperation of different software components used to implement a dispersed data storage network constructed in accordance with an embodiment of the disclosed invention.

FIG. 2 illustrates a distributed computer system implementing a dispersed data storage network 200. The illustrated system consists of a client/user computer 202, a grid access computer 220, and some number of slice servers 240,250,260. Within the client computer 202 an application program 204 accesses an operating system including a file system 206. The operating system may include a separate block layer 208, meaning an interface to block devices such as storage device drivers, or the functionality of the block layer 208 may be incorporated into the file system 206. In either case, read and write commands directed to the file system are forwarded to an iSCSI Initiator 210, which formulates network commands that are carried out by a network layer 212, which is also part of the operating system operating on the client computer 202.

As illustrated, the iSCSI Initiator 210 operating on the client computer 202 is configured to operate with iSCSI Target 222, resident on grid access computer 220. The iSCSI Target 222 receives network commands from the iSCSI Initiator 210 via a separate network layer 224 operating on the grid access computer 220. As opposed to a standard iSCSI Target, which would merely store data on one or more drives accessible to the iSCSI Target, the iSCSI Target 222 operating on the grid access computer 220 is configured to operate with a dispersed data storage network. As will be explained in more detail in the sections that follow, the iSCSI Target 222 implements a data dispersal algorithm in accordance with the commands received from the iSCSI Initiator 210, and either retrieves data from appropriate slice servers 240,250,260 or writes data to the same. Each slice server 240,250,260 also contains a grid server application 244,254,264 that stores and retrieves data slices in accordance with network commands received from the grid access computer 220 via the network layers 242,252,262 of the respective slice servers 240,250,260.

Figure 3:
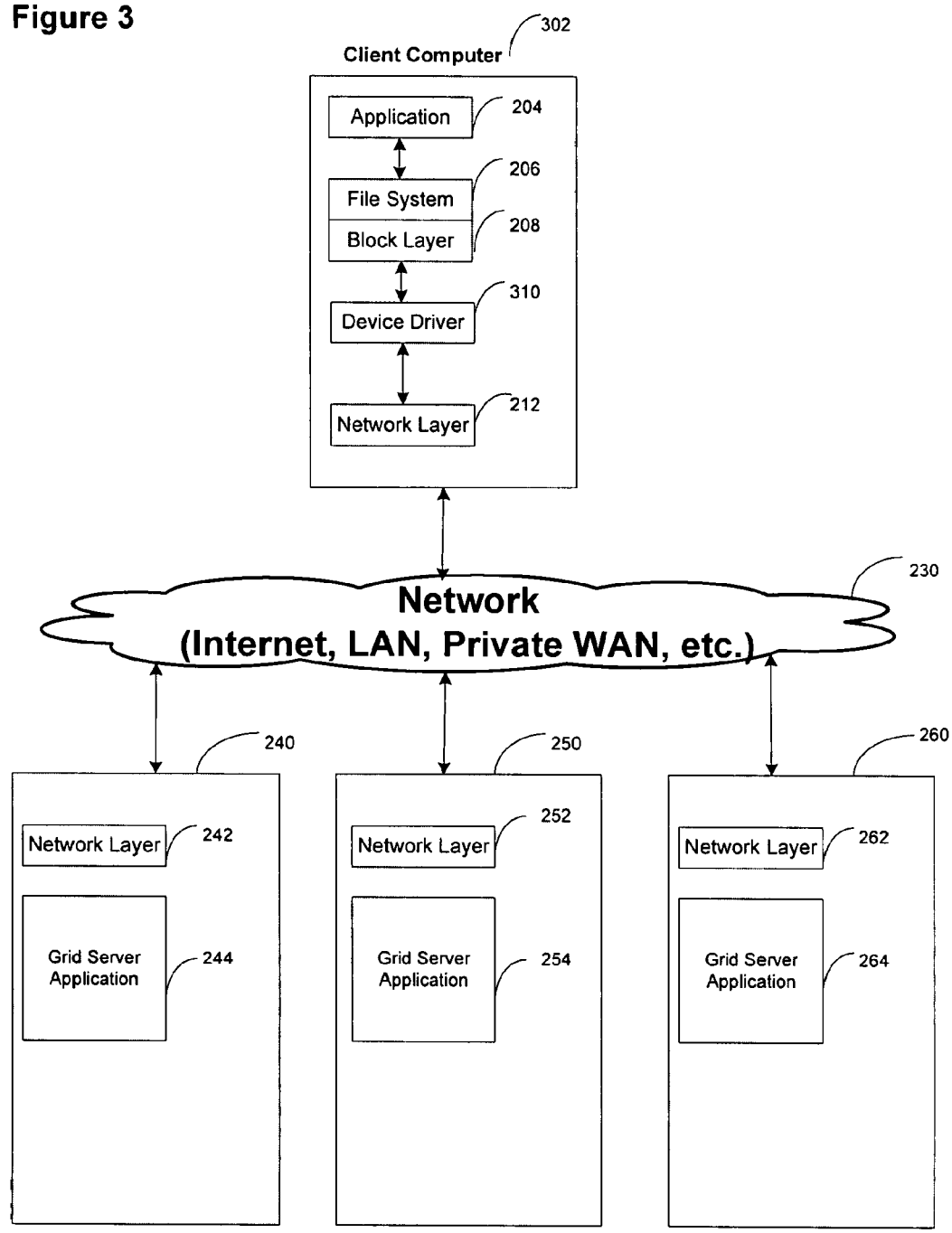
FIG. 3 is a block diagram illustrating the interoperation of different software components used to implement a dispersed data storage network constructed in accordance with a different embodiment of the disclosed invention.

FIG. 3 illustrates a slightly different distributed computer system implementing a dispersed data storage network 300. The illustrated system is identical to that shown in FIG. 2, except that the grid access computer 220 has been entirely removed, and, instead of using an iSCSI Target 222 to implement a block interface to the dispersed data storage network, a device driver 310 resident on the client user computer 302 implements the block interface. In this implementation, the device driver 310 receives read and write commands from the file system 206. The device driver 310 is configured to fulfill read and write commands through the dispersed data storage network 240,250,260. Like the iSCSI Target 222 of the previously discussed implementation, the device driver 310 implements a data dispersal algorithm in accordance with the commands received from the file system 206, and either retrieves data from appropriate slice servers 240,250,260 or writes data to the same. The embodiment of FIG. 3 is otherwise similar to that of FIG. 2.

Figure 4A:
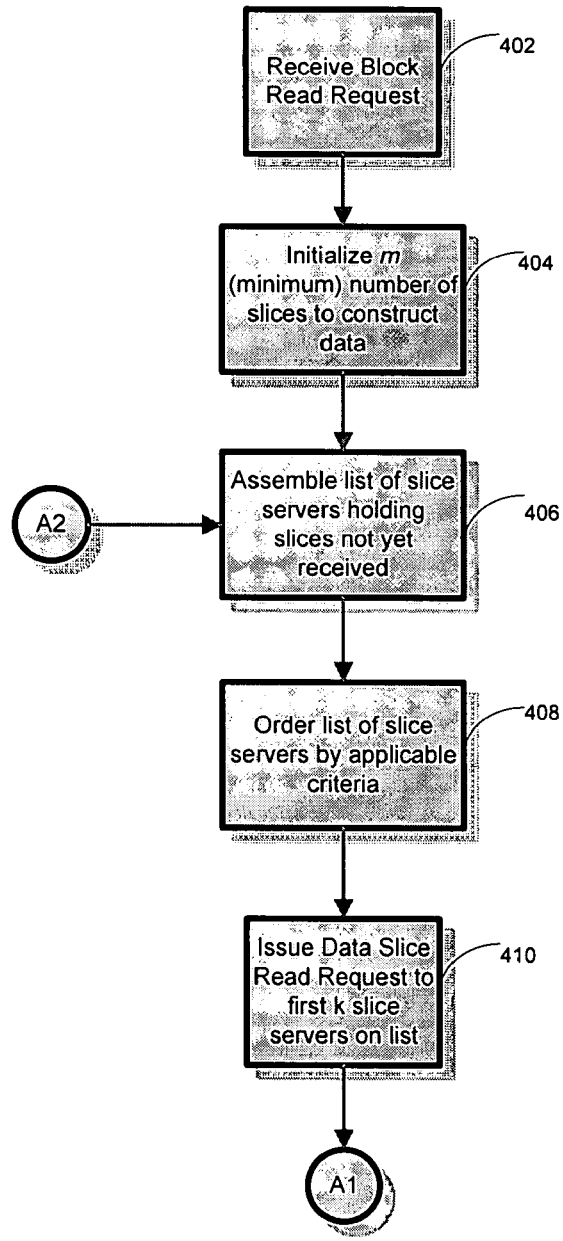
Figure 4B:
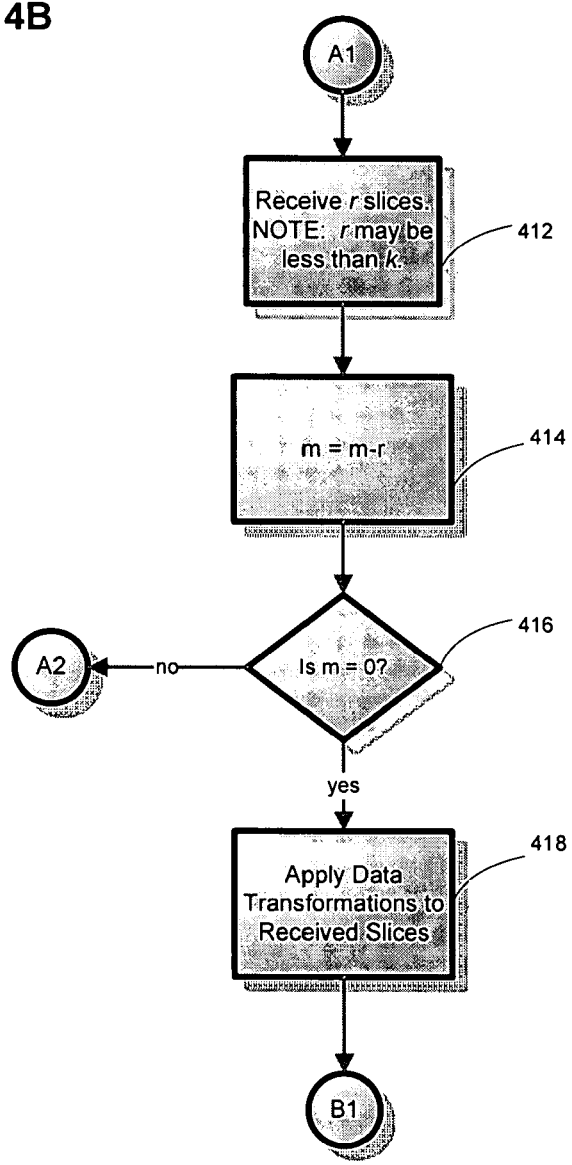

FIGS. 4A-4C show the process by which an iSCSI Target, or other data dispersal/assembly software component, constructed in accordance with the disclosed invention could handle a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in U.S. patent application Ser. No. 11/973,621, titled "VIRTUALIZED DATA STORAGE VAULTS ON A DISPERSED DATA STORAGE NETWORK," filed on Oct. 9, 2007 and assigned to Cleversafe, Inc. In step 404, the variable m is initialized to the minimum number of slices required to construct the requested data. As described herein, for each successfully received and validated slice, m is decremented.

In step 406, a list of slice servers each holding one required data slice that has yet to be received is assembled, and in step 408, the list is ordered by any applicable criteria. Further information on criteria by which the list may be ordered is contained in U.S. patent application Ser. No. 11/973,622, titled "SMART ACCESS TO A DISPERSED DATA STORAGE NETWORK," filed on Oct. 9, 2007 and assigned to Cleversafe, Inc. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. Note that the number of received data slices r may be smaller than the number of requested data slices k. In step 416, m is compared to zero, and if m is not equal to zero, execution returns to step 406, and execution proceeds as normal from there. However, if m is equal to zero, a collection of data transformations may optionally be applied to the received slices in step 418. The applied data transformations can include decryption, decompression, and integrity checking. For example, each data slice may have a cyclical redundancy check ("CRC"), or other form of checksum appended to the data contained in the slice. This checksum could be compared against a checksum calculated against the received data to ensure that the data was not corrupted while it was stored or during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice may be been corrupted. However, if the applied data transformations were successful for all received data slices, the received slices are assembled into the requested block of data in step 424. The same or different data transformations may optionally be applied to the assembled data block in step 426, which completes the read process.

Figure 5A:
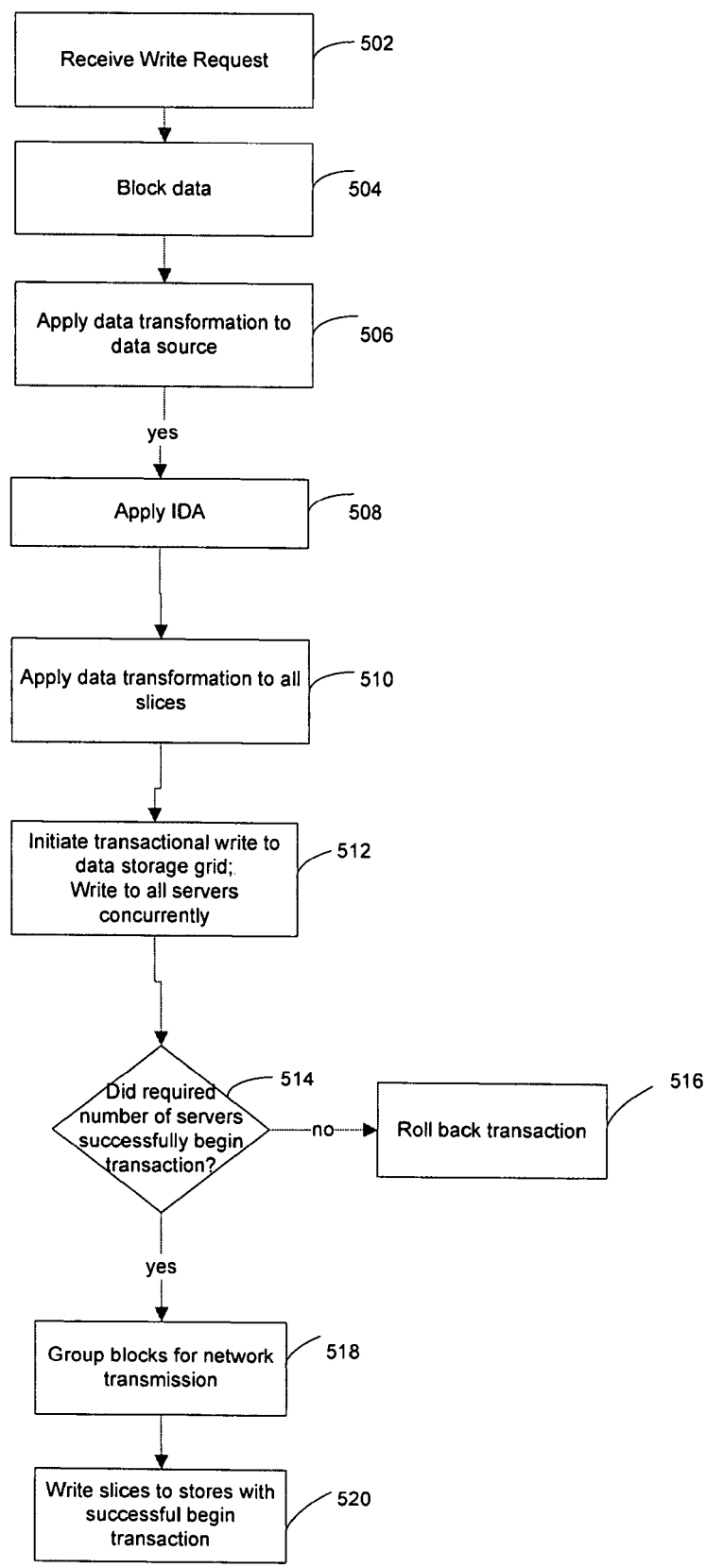
FIGS. 5A-5B collectively illustrates a write operation from a dispersed data storage network constructed in accordance with an embodiment of the disclosed invention.
Figure 5B:
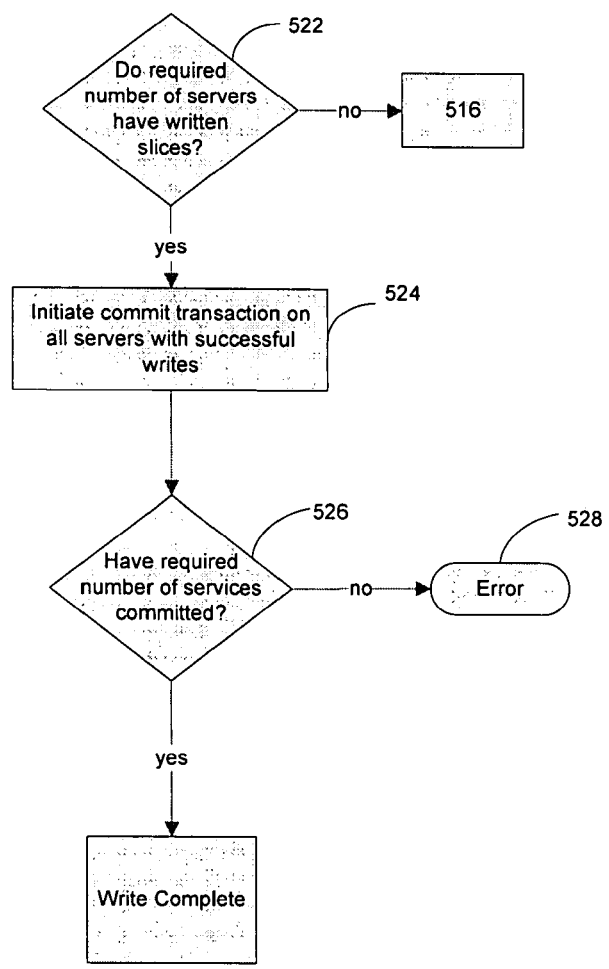

In FIGS. 5A-5B, the process by which an iSCSI Target, or other data dispersal/assembly software component, constructed in accordance with the disclosed invention could handle a write request is illustrated. In step 502 a write request is received. Included in this write request is a data segment to be written that could span many fixed length blocks. In addition, the write request will contain information sufficient to determine which slice servers the data segment should be written to, as well as information required by the information dispersal algorithm to slice each block, i.e., the number of slices to be written, referred to as n, as well as the minimum number of slices that are required to recover the data, referred to as m. Further information on one method that can be used to associate data writes with particular slice servers is contained in U.S. patent application Ser. No. 11/973,621, titled "VIRTUALIZED DATA STORAGE VAULTS ON A DISPERSED DATA STORAGE NETWORK," filed on Oct. 9, 2007 and assigned to Cleversafe, Inc.

In step 504, the data segment is blocked into identical length fixed-size blocks. A number of data transformations may optionally be applied to each block in step 506, and an information dispersal algorithm is applied in step 508. In particular, the Cauchy Reed-Solomon dispersal algorithm could be applied to each block, resulting in a predetermined number of data slices. In step 510, a number of data transformations are optionally applied to each data slice.

In the disclosed system, writes are performed transactionally, meaning that all data slices must be successfully written before a write is deemed complete. In step 512, a write transaction is initiated to the data storage network. As discussed herein, all slice servers are simultaneously contacted, and in step 514, a confirmation that at least n receiving slice servers are prepared to begin the write transaction must be received, or the transaction is rolled back in step 516.

In step 518 blocks are grouped for transmission, and in step 520 data slices are transmitted to the slice servers that indicated their ability to receive and store slices. The number of slice servers that successfully received and stored their assigned data slices is checked in step 522, and if less than n slices are successfully stored, the transaction is rolled back in step 516. In step 524, a commit transaction is begun on all servers with successful writes. If the commit transaction fails, an error is logged in step 528.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of writing data to a dispersed data network, said method operating on at least one computer and comprising the steps of:
   dividing a data segment of data into a plurality of data blocks, wherein data blocks of the plurality of data blocks have a fixed block size;
   performing a data transformation on the plurality of data blocks to produce a plurality of transformed data blocks, wherein the data transformation includes calculating checksums for the plurality of data blocks and further includes one or more of encrypting the plurality of data blocks and compressing the plurality of data blocks;
   performing a data dispersal algorithm on the plurality of transformed data blocks to produce a plurality of "n" number of data slices, wherein one of the plurality of blocks of data is encoded into one of the plurality of "n" number of data slices, and wherein data slices of the plurality of "n" number of data slices are grouped to produce "n" number of data slice groups;
   transmitting write commands for at least "m" number of data slice groups to at least "m" number of slice servers of a plurality of slice servers, wherein "m" is less than "n" and represents a minimum number of data slices to recover the one of the plurality of blocks of data from the one of the plurality of "n" number of data slices; and
   receiving verification of storage of the at least "m" number of data slice groups from the at least "m" number of slice servers.

2. The method of claim 1 further comprises:
   performing a second data transformation on at least one of the plurality of data slices prior to transmitting the write commands.

3. The method of claim 1, wherein the data dispersal algorithm comprises an information dispersal algorithm and wherein the at least "m" number of data slice groups is greater than "m" but less than "n".

4. A computer comprises:
   a network port;
   memory; and
   a processor operably coupled to the network port and to the memory, the processor is operable to:
      divide a data segment of data into a plurality of data blocks, wherein data blocks of the plurality of data blocks have a fixed block size;
      perform a data dispersal algorithm on a plurality of transformed data blocks to produce a plurality of "n" number of data slices, wherein one of the plurality of blocks of data is encoded into one of the plurality of "n" number of data slices, and wherein data slices of the plurality of "n" number of data slices are grouped to produce "n" number of data slice groups;
      transmit, via the network port, write commands for at least "m" number of data slice groups to at least "m" number of slice servers of a plurality of slice servers, wherein "m" is less than "n" and represents a minimum number of data slices to recover the one of the plurality of blocks of data from the one of the plurality of "n" number of data slices; and
      receive, via the network port, verification of storage of the at least "m" number of data slice groups from the at least "m" number of slice servers.

5. The computer of claim 4 further comprises:
   a second data transform algorithm for performing a data transformation on at least one of the plurality of data slices prior to transmitting the write commands.

6. The computer of claim 4, wherein the data dispersal algorithm comprises an information dispersal algorithm and wherein the at least "m" number of data slice groups is greater than "m" but less than "n".

* * * * *

UNITED STATES PATENT AND TRADEMARK OFFICE
CERTIFICATE OF CORRECTION

| | | |
|---|---|---|
| PATENT NO. | : 9,578,097 B2 | Page 1 of 1 |
| APPLICATION NO. | : 12/950755 | |
| DATED | : February 21, 2017 | |
| INVENTOR(S) | : S. Christopher Gladwin et al. | |

It is certified that error appears in the above-identified patent and that said Letters Patent is hereby corrected as shown below:

On the Title Page

Item (75) Please replace "Mainsh Motwani" with --Manish Motwani--.

Signed and Sealed this
Tenth Day of March, 2020

Andrei Iancu
*Director of the United States Patent and Trademark Office*